United States Patent
Murphy et al.

(10) Patent No.: US 11,781,608 B2
(45) Date of Patent: Oct. 10, 2023

(54) ROLLER CAGE ASSEMBLY FOR AN OVERRUNNING CLUTCH

(71) Applicant: TEAM Industries, Inc., Bagley, MN (US)

(72) Inventors: Jordan Murphy, Bemidji, MN (US); John Edward Hamrin, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 17/885,951

(22) Filed: Aug. 11, 2022

(65) Prior Publication Data

US 2023/0052679 A1   Feb. 16, 2023

Related U.S. Application Data

(60) Provisional application No. 63/232,126, filed on Aug. 11, 2021.

(51) Int. Cl.
 *F16D 41/067* (2006.01)
 *B60K 17/35* (2006.01)

(52) U.S. Cl.
 CPC ........ *F16D 41/067* (2013.01); *B60K 17/3515* (2013.01)

(58) Field of Classification Search
 USPC ........................................... 192/45.008–45.2
 See application file for complete search history.

(56) References Cited

U.S. PATENT DOCUMENTS

| 3,630,330 A | 12/1971 | Pflugner | |
| 5,101,946 A * | 4/1992 | Lederman | F16D 41/067 |
| | | | 192/45.006 |
| 5,279,399 A * | 1/1994 | Riggle | F16D 41/067 |
| | | | 192/113.32 |

(Continued)

FOREIGN PATENT DOCUMENTS

| CN | 108331898 A | 7/2018 |
| GB | 2252801 A | 8/1992 |

OTHER PUBLICATIONS

International Searching Authority, "International Search Report and Written Opinion", from PCT Application No. PCTUS 2022/0400696, from Foreign Counterpart to U.S. Appl. No. 17/885,951, filed Dec. 7, 2022, pp. 1 through 17, Published in: KR.

*Primary Examiner* — Timothy Hannon
(74) *Attorney, Agent, or Firm* — Fogg & Powers LLC

(57) ABSTRACT

A roller cage assembly for an overrunning clutch is provided. The roller cage assembly includes a roller cage, a plurality of rollers and a plurality of roller spring assemblies. The roller cage includes a plurality of spaced support members axially extending between disk shaped first and second end portions. The plurality of rollers are positioned within the roller cage. The plurality of roller spring assemblies engage the roller cage. The plurality of spring roller assemblies are configured to provide a bias force on each roller away from the roller cage. Each roller cage assembly extends between the first and second end portions of the roller cage. Each roller spring assembly further includes at least one pair of attachment members configured to engage a support member of the roller cage.

19 Claims, 17 Drawing Sheets

(56) References Cited

U.S. PATENT DOCUMENTS

| | | | |
|---|---|---|---|
| 6,629,590 B2 * | 10/2003 | Ochab | B60K 23/06 384/526 |
| 10,150,369 B2 * | 12/2018 | Thornton | F16D 27/112 |
| 2006/0266611 A1 | 11/2006 | Updyke et al. | |

* cited by examiner

ROLLER CAGE ASSEMBLY FOR AN OVERRUNNING CLUTCH

CROSS-REFERENCE TO RELATED APPLICATIONS

This application claims priority to U.S. Provisional Application No. 63/232,126 filed on Aug. 11, 2021, and titled "OVERRUNNING CLUTCH ROLLER CAGE SPRING ASSEMBLY," the contents of which are incorporated herein in their entirety.

BACKGROUND

Vehicle differentials transfer torque between a driveshaft and driven shafts (or half shafts). A differential allows the half shafts to rotate at different rotational speeds relative to each other when a vehicle turns to prevent tire scrubbing, reduce transmission loads, and reduce under-steering during cornering (the tendency of the vehicle to go straight in a corner). In four-wheel drive applications, bi-directional overrunning clutches (ORC) have been employed in differentials to transmit torque to the wheel via the half shafts when needed. For example, in a front differential example, the front differential is designed to transfer torque when the rear wheels are rotating faster than the front wheels.

Overrunning clutch designs typically incorporate a roller cage. A roller cage has different modes of operation. A rotational position of the roller cage relative to a clutch cam housing determines the operating mode of the drive. If the roller cage is retarded from its neutral position, the drive operates as an over-running clutch (ORC mode). If the cage is in its neutral position, the drive is fully disengaged. If the cage is advanced, the drive operates as an under-running clutch.

A roller cage holds a plurality of rollers that are used to selectively lock rotation of a clutch can housing and side hubs therein allowing torque to be transferred between the clutch cam housing and the side hubs

SUMMARY OF INVENTION

The following summary is made by way of example and not by way of limitation. It is merely provided to aid the reader in understanding some of the aspects of the subject matter described. Embodiments provide an improved effective and efficient roller cage and spring design for an overrunning clutch.

In one embodiment, a roller cage assembly for an overrunning clutch is provided. The roller cage assembly includes a roller cage, a plurality of rollers and a plurality of roller spring assemblies. The roller cage includes a plurality of spaced support members axially extending between disk shaped first and second end portions. The plurality of rollers are positioned within the roller cage. The plurality of roller spring assemblies engage the roller cage. The plurality of spring roller assemblies are configured to provide a bias force on each roller away from the roller cage. Each roller cage assembly extending between the first and second end portions of the roller cage. Each roller spring assembly further includes at least one pair of attachment members configured to engage a support member of the roller cage.

In another embodiment, a differential with a bi-directional overrunning clutch is provided. The differential includes a housing, a ring gear, a clutch cam housing, first and second side hubs, and a roller cage assembly. The ring gear is positioned within the housing and is in operational communication with a pinion. The clutch cam housing includes a central passage. An inside surface of the clutch cam housing defines the central passage the includes spaced cam features. A rotation of the clutch cam housing is locked to a rotation of the ring gear within the housing. A first portion of the first side hub is received within the central passage of the clutch cam housing. A first portion of the second side hub received within the central passage of the clutch cam housing. The roller cage assembly is received within the central passage of the clutch cam housing. The roller cage assembly is further positioned between the inside surface of the central passage of the clutch cam housing and the first and second portions of the first and second side hubs. The roller cage assembly including a roller cage, a plurality of rollers positioned within the roller cage, and a plurality of roller spring assemblies engaging the roller cage. The plurality of rollers include a first set of rollers that engage an outside surface of the first portion of a first side hub and a second set of rollers that engage an outside surface of the first portion of the second side hub. The plurality of roller spring assemblies are configured to provide a bias force on each roller away from the roller cage. Each roller spring assembly extending between first and second end portions of the roller cage to provide the bias force to rollers from both of the first and second set of rollers. Each roller spring assembly further includes at least one pair of attachment members configured to engage the roller cage. A centering spring engages the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing.

In yet another embodiment, a vehicle is provided. The vehicle includes a motor, a transmission, a pair of rear wheels, a pair of front wheels, and a front differential. The motor to provide engine torque. The transmission is in operational communication to receive the engine torque. The rear differential is in operational communication with the transmission. The pair of rear wheels in operational communication with the rear differential. The front differential selectively couples torque between the transmission and at least one front wheel of the pair of front wheels. The front differential includes a roller cage, a plurality of rollers and a plurality of roller spring assemblies. The roller cage includes a plurality of spaced support members axially extending between disk shaped first and second end portions. The plurality of rollers are positioned within the roller cage. The plurality of roller spring assemblies engages the roller cage. The plurality of spring roller assemblies are configured to provide a bias force on each roller away from the roller cage. Each roller spring assembly extending between the first and second end portions of the roller cage. Each roller spring assembly including at least one pair of attachment members configured to engage a support member of the roller cage.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an improved roller cage and roller spring assemblies for a bi-directional overrunning clutch. The roller spring assemblies described improve reduce complexity, part count, and assembly complexity over prior art designs. They also ensure the rollers are always pushed outward towards an associated clutch cam housing as described below.

Figure 1:
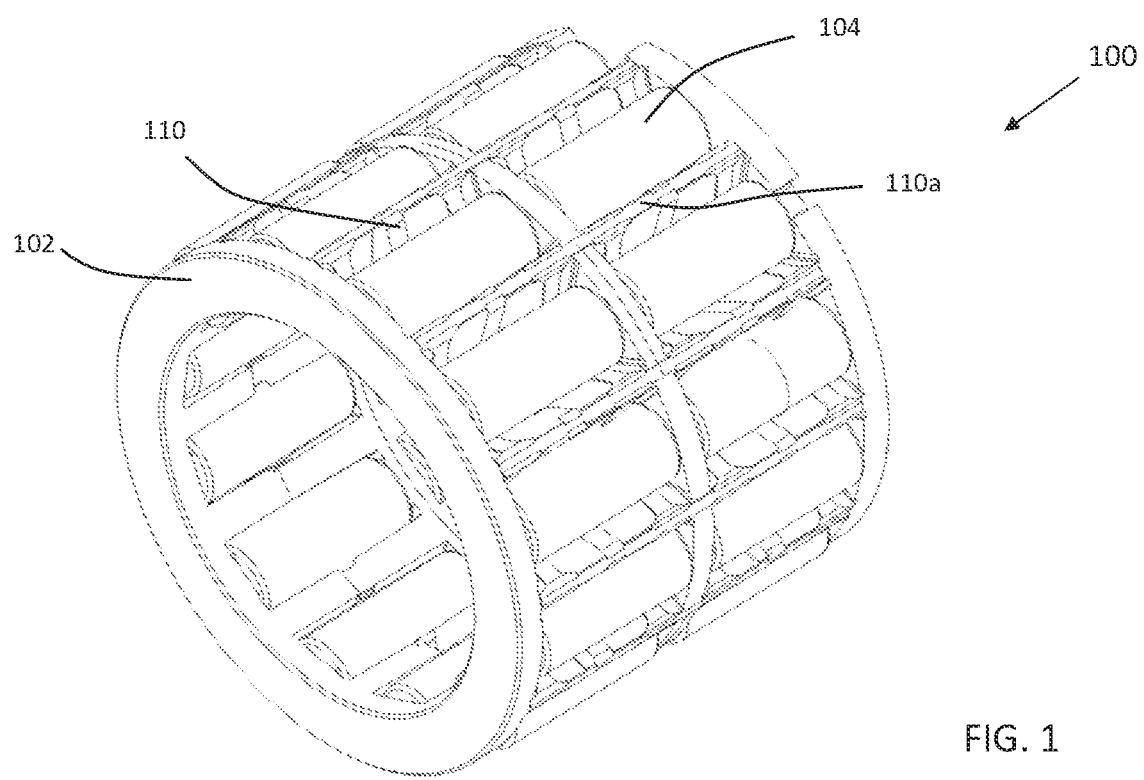
FIG. 1 is a side perspective view of a roller cage assembly according to one exemplary embodiment.

An example of an assembled roller cage assembly 100 of one embodiment is provided in FIG. 1. The roller cage assembly 100 includes a roller cage 102, rollers 104 and roller spring members 110.

Figure 2:
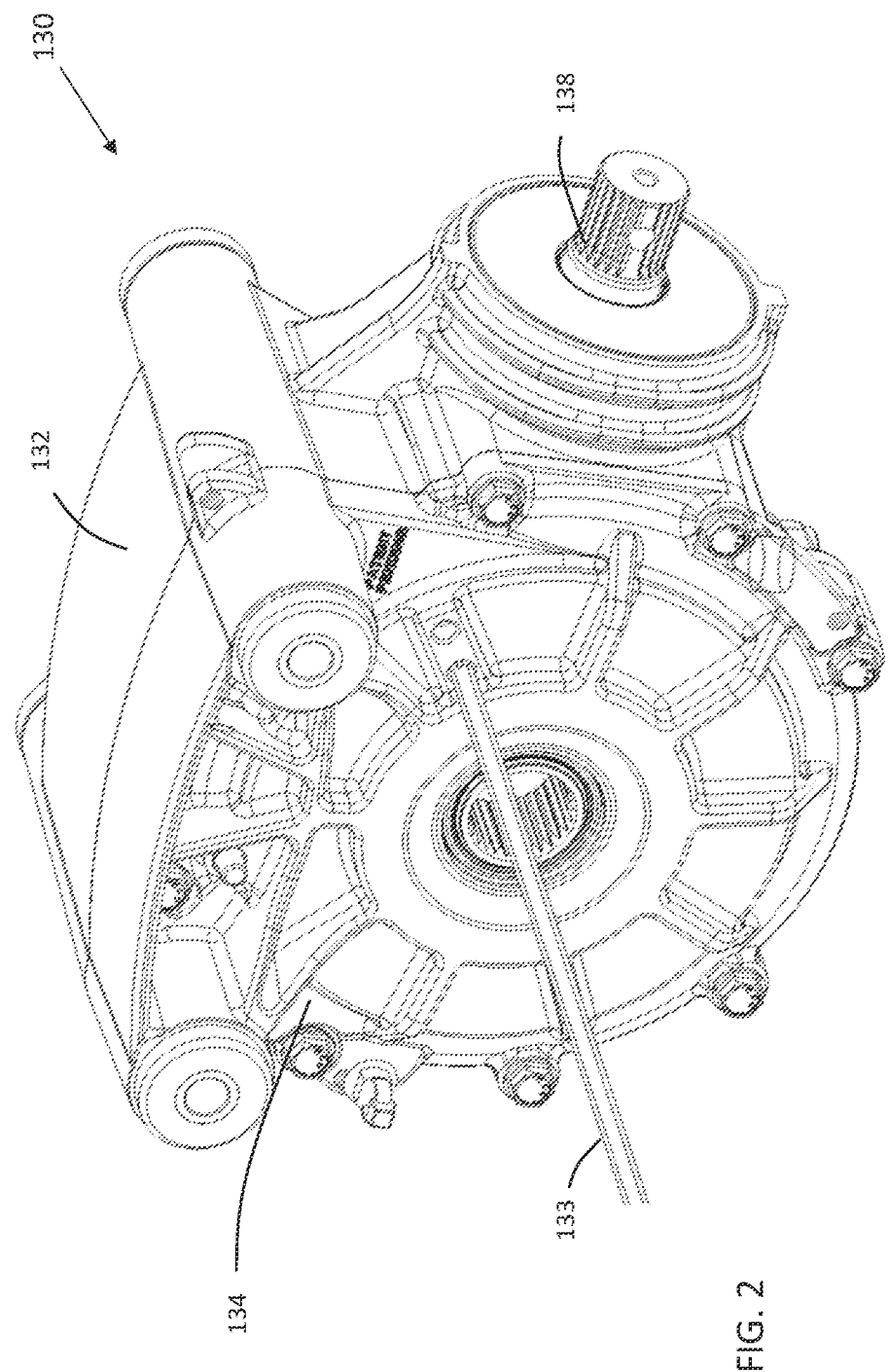
FIG. 2 is a side perspective view of differential that includes a roller cage assembly

The roller cage assembly 100 may part of a differential that includes a bi-directional overrunning clutch (ORC). An example of a differential 130 is illustrated in FIG. 2. In this example, the differential 130 is a front differential. However, embodiments of the overrunning clutch with inertial compensation tuning may be applied to any type of differential system. As illustrated, in FIG. 2, the differential 130 includes a housing 132 (or case) and a cover 134. An activation input cable 133 used to selectively activate an ORC electromagnet. Further illustrated in FIG. 2 is a transmission input coupler (pinion 138) that in one embodiment includes a pinion gear as discussed below. The pinion 138 is configured to couple torque between a transmission and the differential 130 via prop shaft, drive shaft, or the like.

Figure 3:
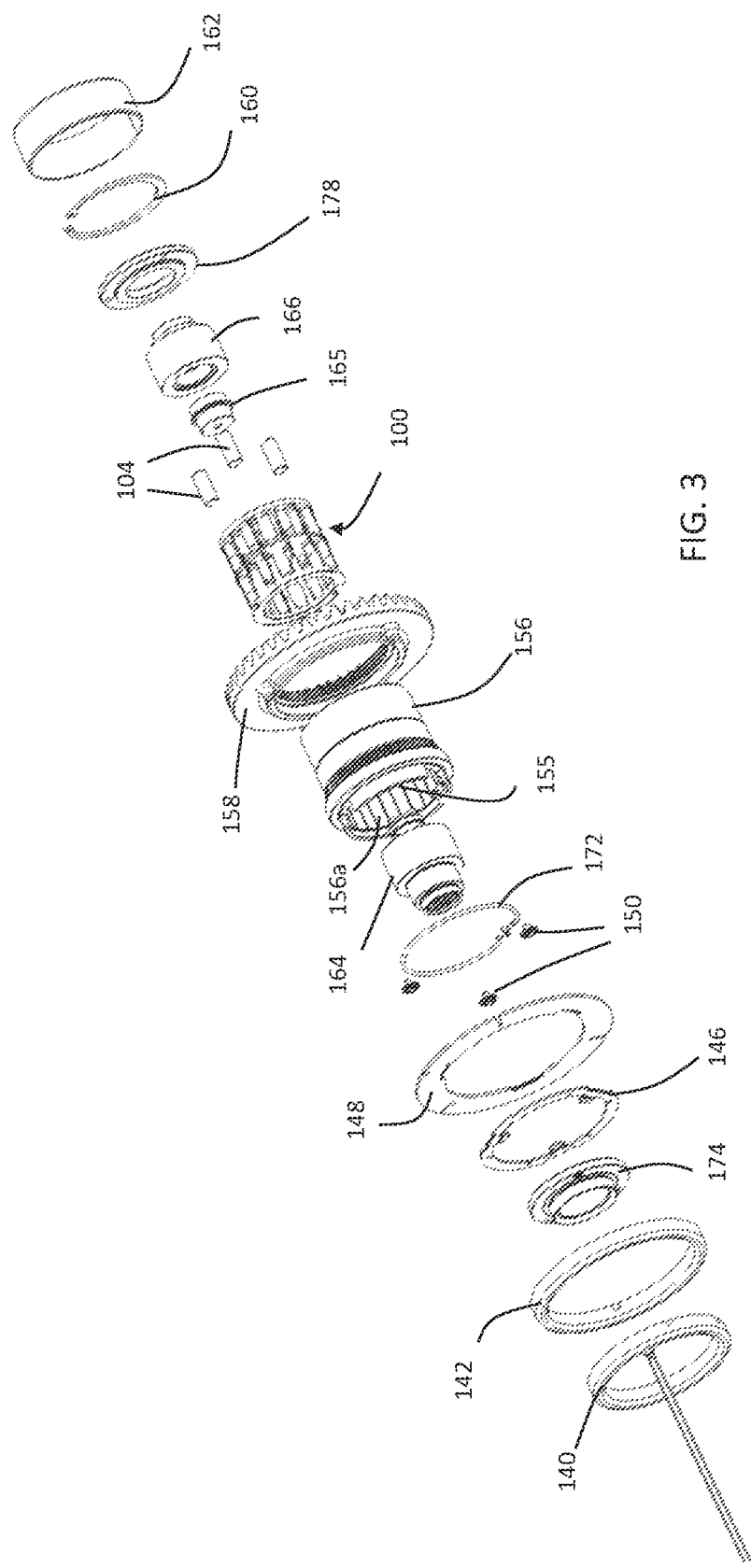
FIG. 3 is an unassembled view of some components of the differential of FIG. 2.

FIG. 3 illustrates an unassembled view of some of the components of the differential 130. The components of the differential 130 include a clutch cam housing 156. Engaged on an outer surface of the clutch cam housing 156 is a ring gear 158. In this example, internal splines of the ring gear 158 engage external splines on the clutch cam housing 156 to lock rotation of the clutch cam housing 156 with rotation of the ring gear 158. In another example, the clutch cam housing/ring gear are formed from one piece. The clutch cam housing 156 includes a central passage 155. Cam features 156a are formed within an interior surface defining the central passage 155. The overrunning clutch with inertial compensation tuning system further includes a retaining ring 160 and plain bearing 162.

Figure 13:
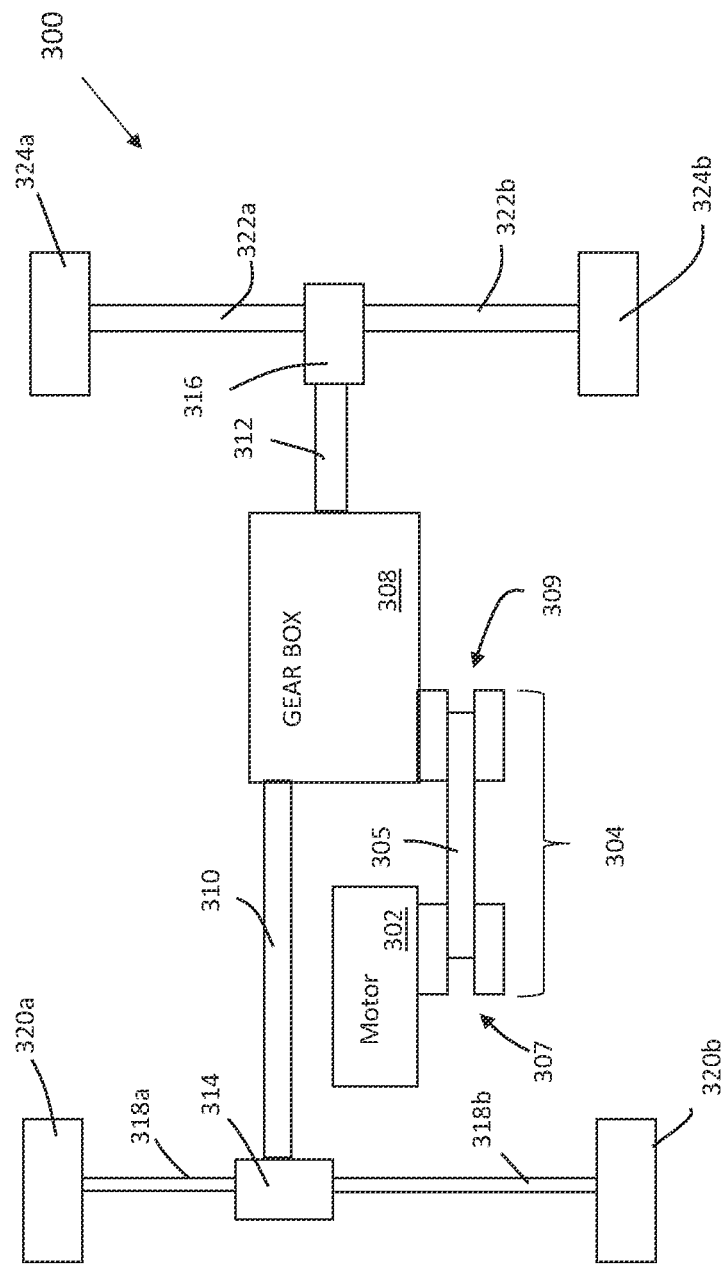
FIG. 13 is a block diagram of vehicle with a differential that includes an overrunning clutch roller cage spring assembly according to one exemplary embodiment.

The roller cage assembly 100 is received within the clutch cam housing 156 such that each roller 104, held by the roller cage 102 is aligned with an associated cam feature 156a within the interior surface of the clutch cam housing 156. Received within the roller cage 102 are a first side hub 164, a second side hub 166 and a centering hub 165. The first side hub 164 and second side hub 166 are designed to couple torque between the hubs 164 and 166 and their associated half shafts (such as half shafts 318a and 318b of FIG. 13). The rollers 104 of the roller cage 102 engage an outer surface of the first and second side hubs 164 and 166. In particular, a first set of rollers 104 engage a portion of the first side hub 164 and a second set of rollers 104 engage a portion of the second side hub 166.

The rollers 104 in part, located by the roller cage 102, are operationally engaged with outer surfaces of a first portion of the side hubs 164 and 166. In an example, a roller cage portion of the roller cage 102 never directly touches the clutch cam housing 156 but is located in all degrees of freedom except rotation by the end caps 174 and 178 that are located by the clutch cam housing 156. The end caps 174 and 178 are mounted on second portions of associated side hubs 164 and 166 in this example.

When the system is engaged in an ORC or back-drive mode, the rollers 104 are in direct contact with the clutch cam features of 156a of the clutch cam housing 156 and the first portion of the side hubs 164 and 166 to transfer torque between the clutch cam housing 156 and the first and second side hubs 164 and 166.

Figure 4:
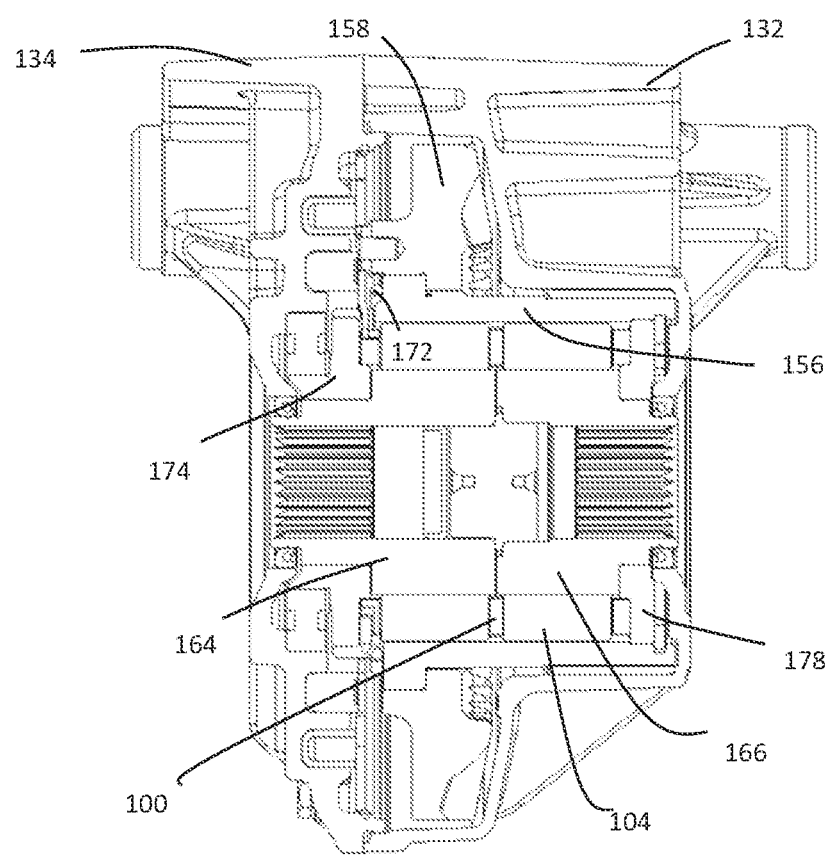
FIG. 4 is an assembled cross-sectional side view of the differential of FIG. 2.

The overrunning clutch with inertial compensation tuning system further includes a centering spring 172. The centering spring 172 engages the clutch cam housing 156 and the roller cage 102 to position the rollers 104 of the roller cage 102 in relation to the cam features 156a of the clutch cam housing 156 so torque is not transferred between the clutch cam housing 156 and the side hubs 164 and 166 during de-energized neutral operating conditions. This may be described as the neutral position of the roller cage assembly 100. FIG. 4 illustrates a cross-sectional side view of the differential 130 that include the components. FIG. 4 illustrates the positioning of the roller cage 102 and roller 104 relative to the clutch cam housing 156 and side hubs 164 and 166.

The differential 130 in this example, includes an inertial compensation assembly that selectively locks rotation of the roller cage assembly 100 to a clutch cam housing to prevent unintended activation of the overrunning clutch. The inertial compensation assembly includes an ORC armature friction plate (armature plate 146) and an ORC electromagnetic coil 140 (ORC coil 140). The armature plate 146 is selectively positioned by the ORC coil 140 to prevent the roller cage assembly 100 from moving in relation to a clutch cam housing 156 to prevent the roller cage assembly from retarding from the neutral position. The inertial compensation assembly may further include a flyweight friction plate (flyweight plate 148), pivot gears 150 and a (BDM) coil (back-drive coil 142). The flyweight plate is selectively positioned by the back-drive coil 142 to lock rotation of the roller cage assembly 100 in relation to the clutch cam housing 156 to prevent the roller cage assembly 100 from advancing from the neutral position. The roller cage assembly 100 may include an end portion, such as the second end portion 102c, as illustrated in FIG. 8C, that includes notches 250 and 251 used to selectively lock the roller cage assembly 100 to the clutch cam housing 156 by energizing or not energizing the ORC coil 140 and back-drive coil 142.

Figure 5:
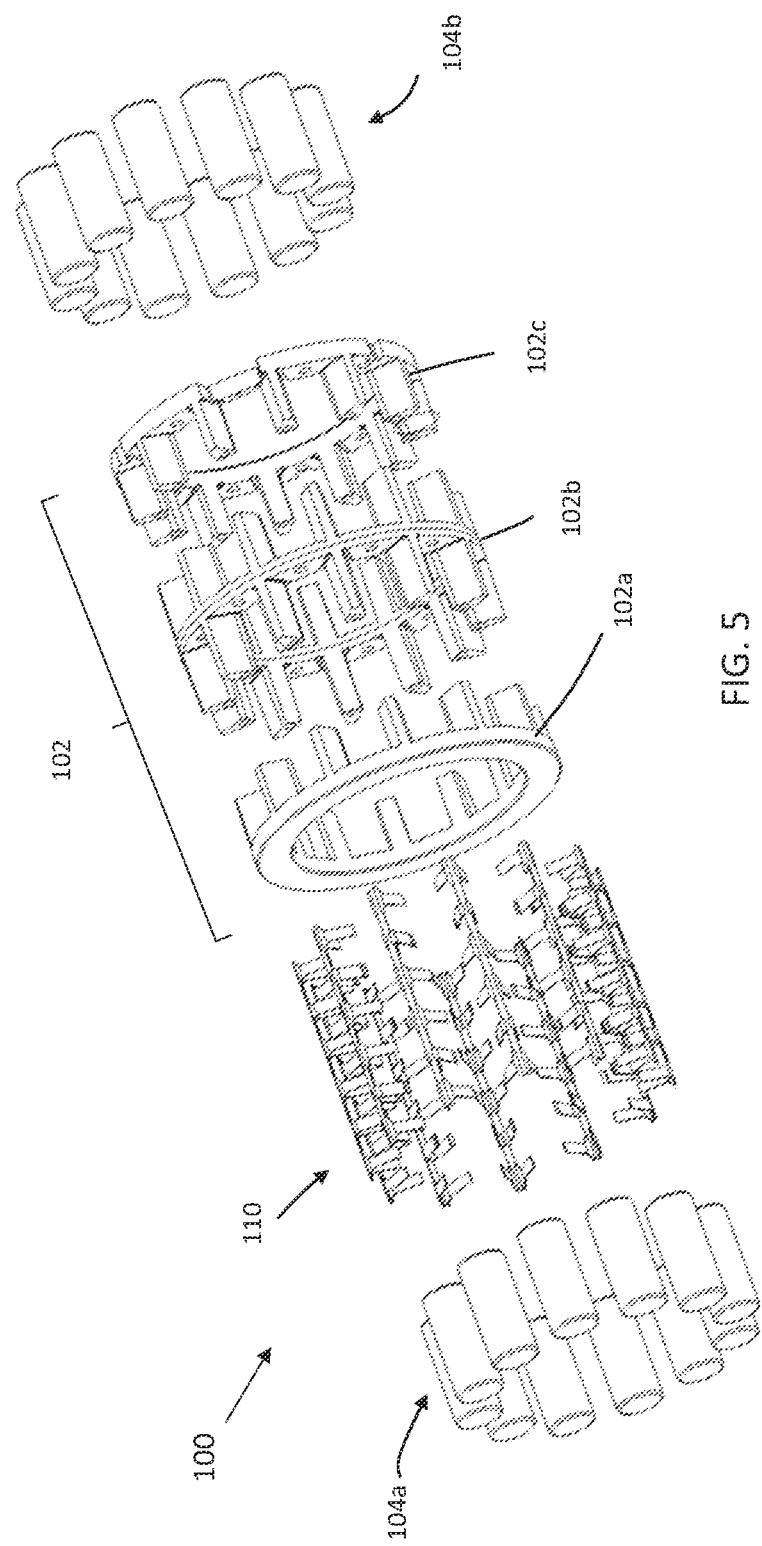
FIG. 5 is an unassembled side perspective view of the roller cage assembly of FIG. 1.
Figure 6:
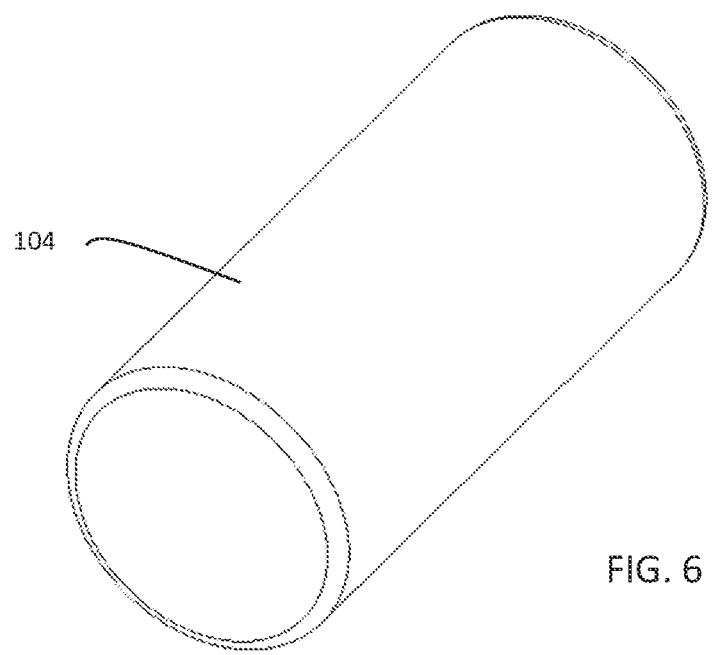
FIG. 6 is a side perspective view of a roller according to one exemplary embodiment.

FIG. 5 illustrates an embodiment of a roller cage assembly 100. The roller cage assembly 100 includes a roller cage 102 that in this example is formed from three portions, end portions 102a and 102c and mid-portion 102b. The roller cage assembly 100 further includes two sets of rollers 104a and 104b and roller springs 110. FIG. 6 illustrates an example of a roller 104.

Figure 7A:
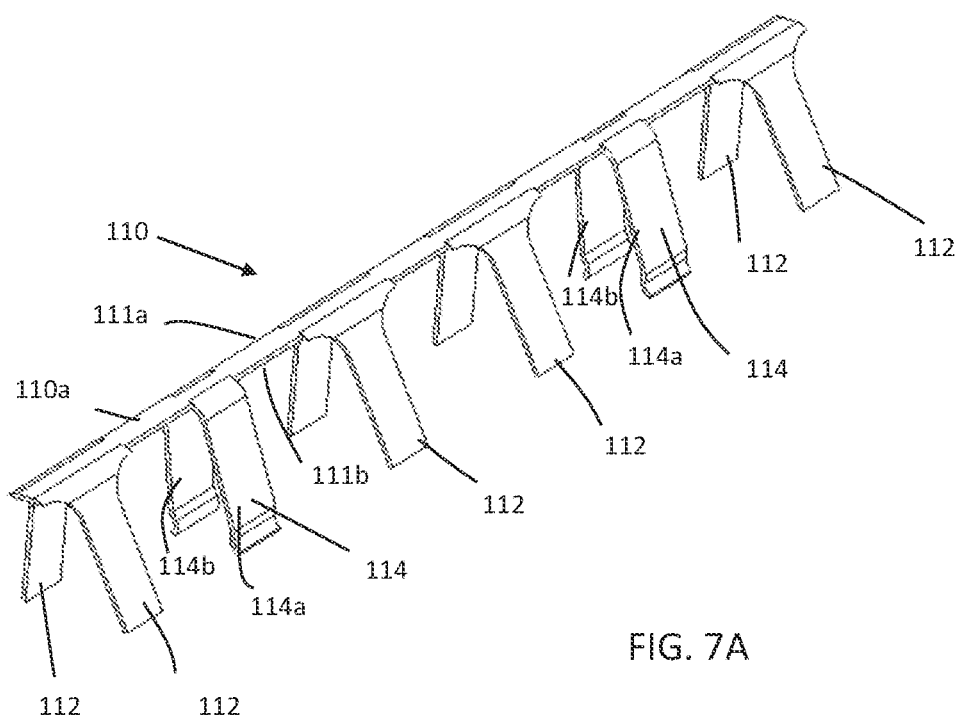
FIG. 7A is a side perspective view of a roller spring assembly according to one exemplary embodiment.
Figure 7C:
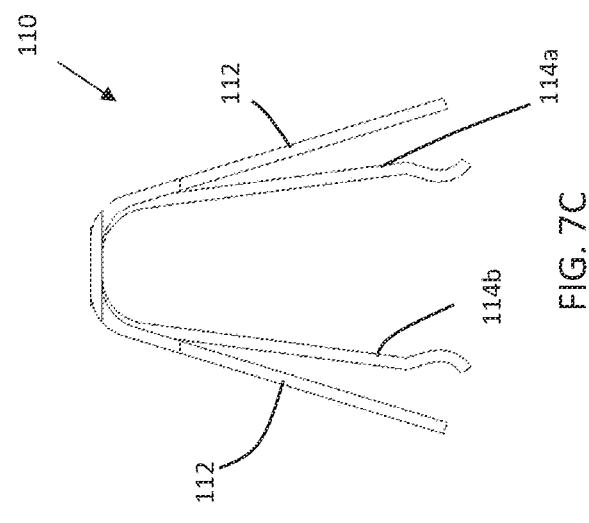
FIG. 7C is an end view of the roller spring assembly of FIG. 7A.
Figure 7B:
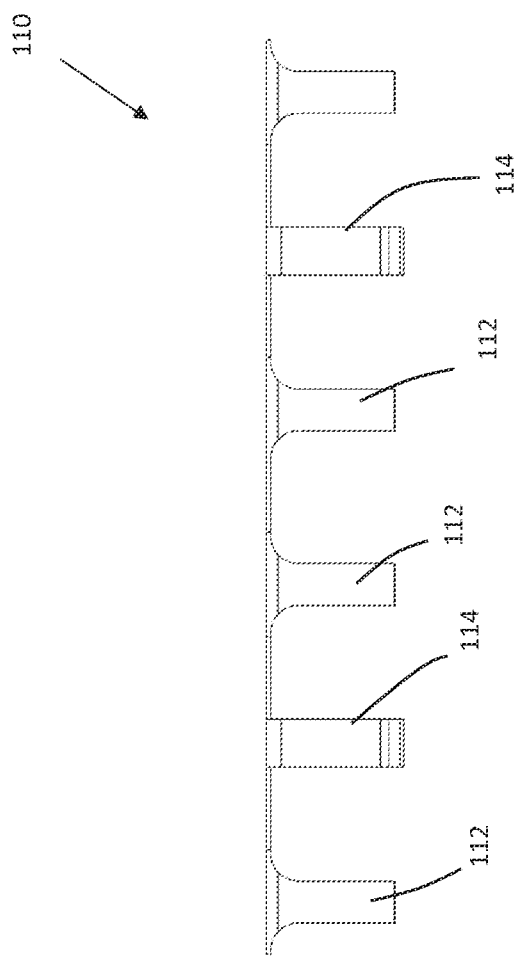
FIG. 7B is a side perspective view of the roller spring assembly of FIG. 7A.

FIG. 7A illustrates a side perspective view of a roller spring assembly 110, FIG. 7B illustrates a side view of the roller spring assembly 110 and FIG. 7C illustrates an end view of the roller spring assembly 110. Each roller spring assembly 110 includes a central base plate 110a. As best illustrated in FIG. 1, the central base plate 110a has a length that extends between the end portions 102a and 102c of the roller cage 102. As illustrated in FIG. 7A, extending from opposite edges 111a and 111b of the central base plate 110a at select angles of a roller spring assembly 110 are a plurality of spaced biasing members 112 and attachment members 114.

A pair of attachment members 114a and 114b of the attachments members 114 in this example are designed to work together to couple each roller spring 110 to the roller cage 102. As best illustrated in the partial view of the roller cage 102, rollers 104 and roller spring assembly 110 of FIG. 10A, FIG. 10B and FIG. 10C, retaining portions 115a and 115b of a respective pair of attachment members 114a and 114b are shaped to retain the roller spring assembly 110 to each associated support member 120 of the roller cage 102. In the example, the retaining portions are shaped to extend towards each other to engage a retaining feature 121 (such as an angled recess) in the support member 120 of the roller cage 102. Hence, each roller spring 110 may be snap fitted on its associated support member 120.

Figure 10A:
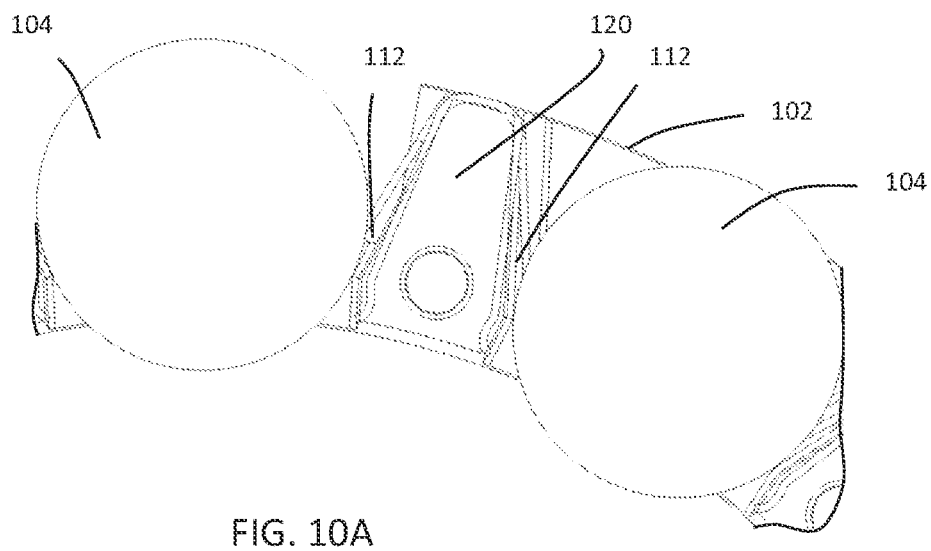
FIG. 10A is a partial end view of a portion of a roller cage having a roller spring assembly attached with positioned rollers according to one exemplary embodiment.
Figure 10C:
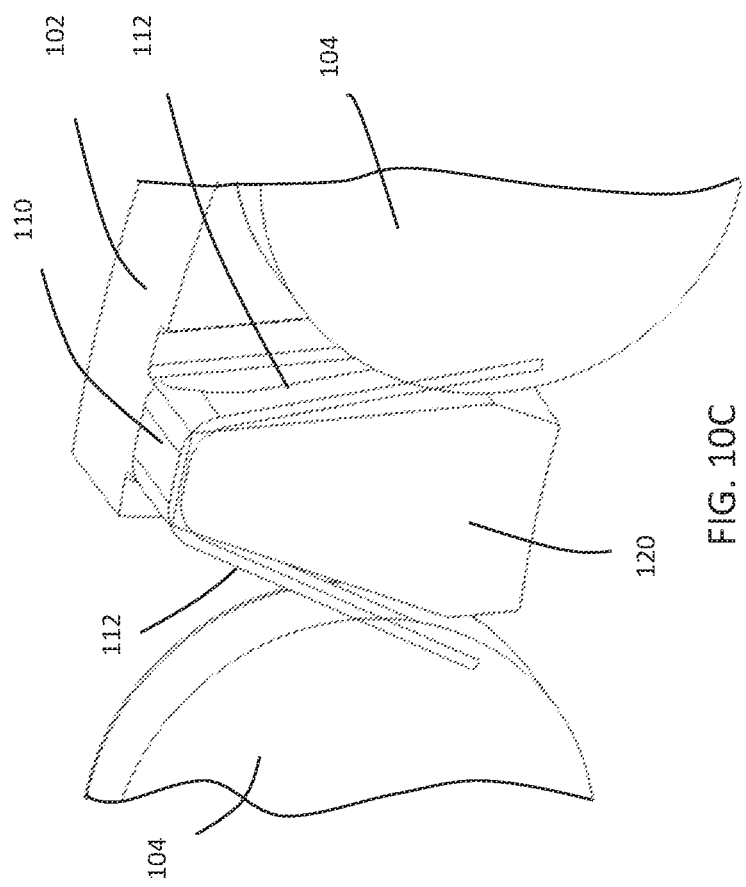
FIG. 10C is a partial end perspective view of a portion of a roller cage including rollers and a roller spring assembly according to one exemplary embodiment.
Figure 10B:
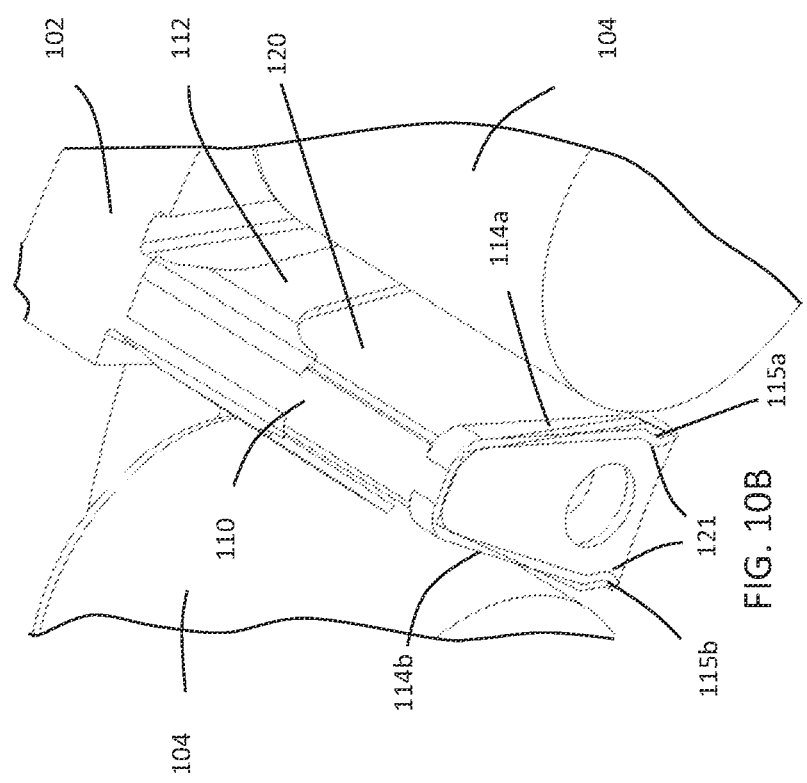
FIG. 10B is a partial end perspective view of a portion of a roller cage including rollers and a roller spring assembly according to one exemplary embodiment.

The biasing members 112 of the roller spring assembly 110 engage the rollers 104 to provide a biasing force on the rollers away from the roller cage 102 towards the cam features in the inside surface of the clutch cam housing. This is best illustrated in FIGS. 10A and 10C.

Figure 8A:
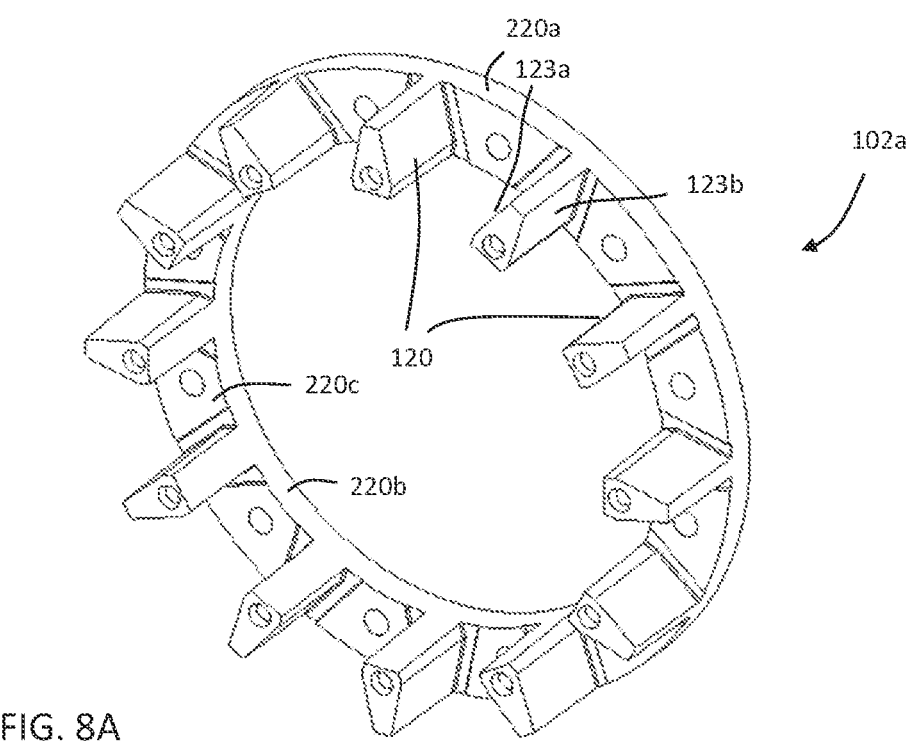
FIG. 8A is a side perspective view of a first end portion of the roller cage illustrated in FIG. 5.
Figure 8B:
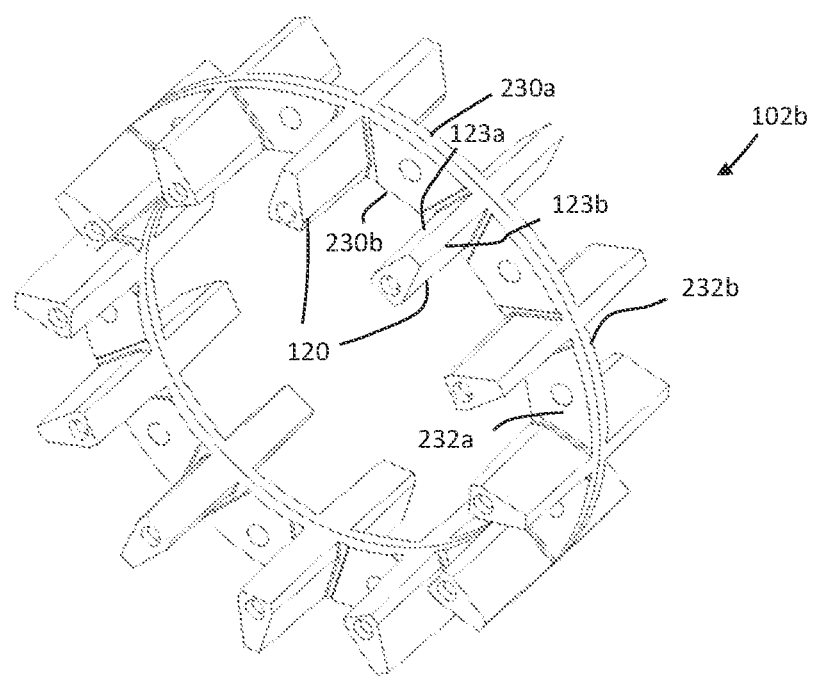
FIG. 8B is a side perspective view of a mid-portion of the roller cage illustrated in FIG. 5.
Figure 8C:
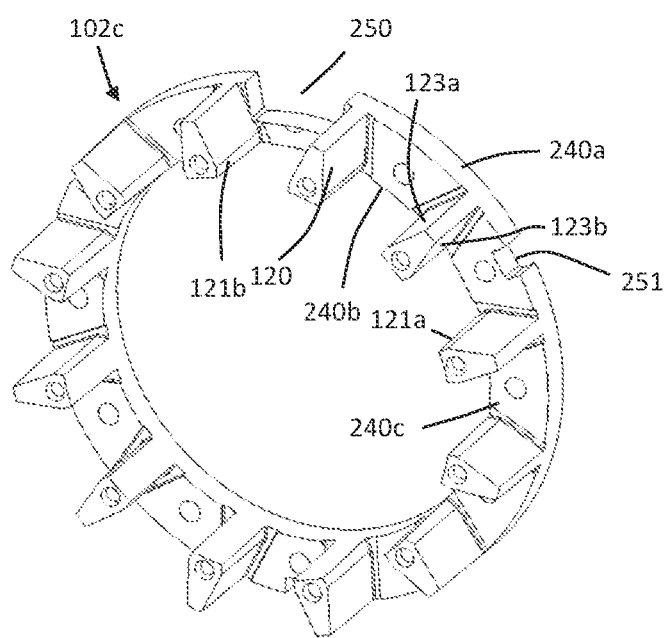
FIG. 8C is a side perspective view of a second end portion of the roller cage illustrated in FIG. 5.

FIG. 8A illustrates the first end portion 102a in a three-piece roller cage 102 example embodiment. FIG. 8B illustrates the mid-portion 102b of the roller cage 102 and FIG. 8C illustrates a second end portion 102c of the roller cage 102.

Figure 9:
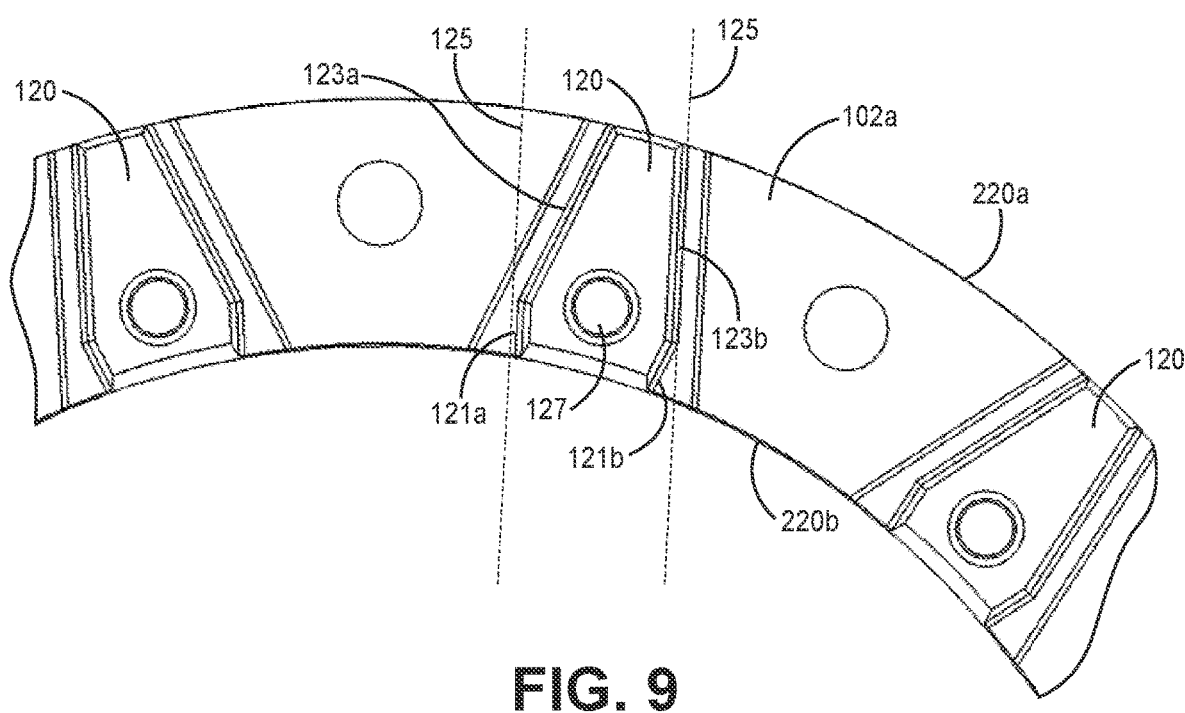
FIG. 9 is a partial close-up view of the first end portion of a roller cage of FIG. 8A.

The first end portion 102a, illustrated in FIG. 8A and the close-up partial end view of FIG. 9, is in a disk shape configuration that as an outer edge 220a that defines an outer diameter of the first end portion 102a and an inner edge 220b that defines an inner diameter of the first end portion 102a. The plurality of spaced first support members 120 extend axially from an inside surface 220c of the first end portion 102a. Each first support member 120 includes opposing sidewalls 123a and 123b extending from the outer edge 220a of first end portion 102a to the inner edge 220b of the first end portion 102a at a select angle such that each first support member 120 is narrower at the outer edge 220a of the first support portion 120 than the first support member 120 at the inner edge 220b of the first disk portion 102a. Each sidewall 123a and 123b includes a retaining feature 121a and 121b proximate the inner edge 220b of the first end portion 102a. Each retaining feature 121a and 121b runs parallel to an opposite sidewall 123b and 123a of the opposing sidewalls. For example, as illustrated in FIG. 9, sidewall 123b, which is parallel to lines 125, is parallel to retaining feature 121a. Similarly, sidewall 123a runs parallel to retaining feature 121b. Also illustrated in FIG. 9 are connection pin bores 127 used to connect the portions 102a, 102b and 102c together to form the roller cage 102.

The mid-portion 102b of the roller cage 102 is positioned between the first end portion 102a and the second end portion 102c. The mid-portion 102b, as illustrated in FIG. 8B is also in a disk shape configuration having an outer edge 230a that defines an outer diameter of the mid-portion 102b and an inner edge 230b that defines an inner edge of the mid-portion 102b. The mid-portion 102b further includes a plurality of spaced mid support members 120 extending axially from side surfaces 232a and 232b of the mid-portion 102b. Each mid support member 120 includes opposing sidewalls 123a and 123b extending from the outer edge 230a of mid-portion 102b to the inner edge 230b of the mid-portion 102b at a select angle such that each mid support member 120 is narrower at the outer edge 230a of the mid-portion 102b than the mid support member 120 at the inner edge 230b of the mid-portion 102b. Each sidewall 123a and 123b includes a retaining feature 121a and 121b proximate the inner edge 230b of the mid-portion 102b. Each retaining feature 121a and 121b running parallel to an opposite sidewall of the opposing sidewalls 123b and 123a.

The second end portion 102c, illustrated in FIG. 8C, is further in a disk shape configuration having an outer edge 240a that defines an outer diameter of the second end portion 102c and an inner edge 240b that defines an inner edge of the second end portion 102c. The second end portion 102c further including a plurality of spaced second support members 120 extending axially from an inside surface 240c of the second end portion 102c. Each second support member 120 including opposing sidewalls 123a and 123b extending from the outer edge 240a of the second end portion 102c to the inner edge 240b of the second end portion 102c at a select angle such that each second support member 120 is narrower at the outer edge 240a of the second end portion 102c than the second support member 120 at the inner edge 240b of the second end portion 102c. Each sidewall 123a and 123b includes a retaining feature 121a and 121b proximate the inner edge 240b of the second end portion 102c. Each retaining feature 121a and 121b running parallel to an opposite sidewall of the opposing sidewalls 123b and 123a.

Figure 11:
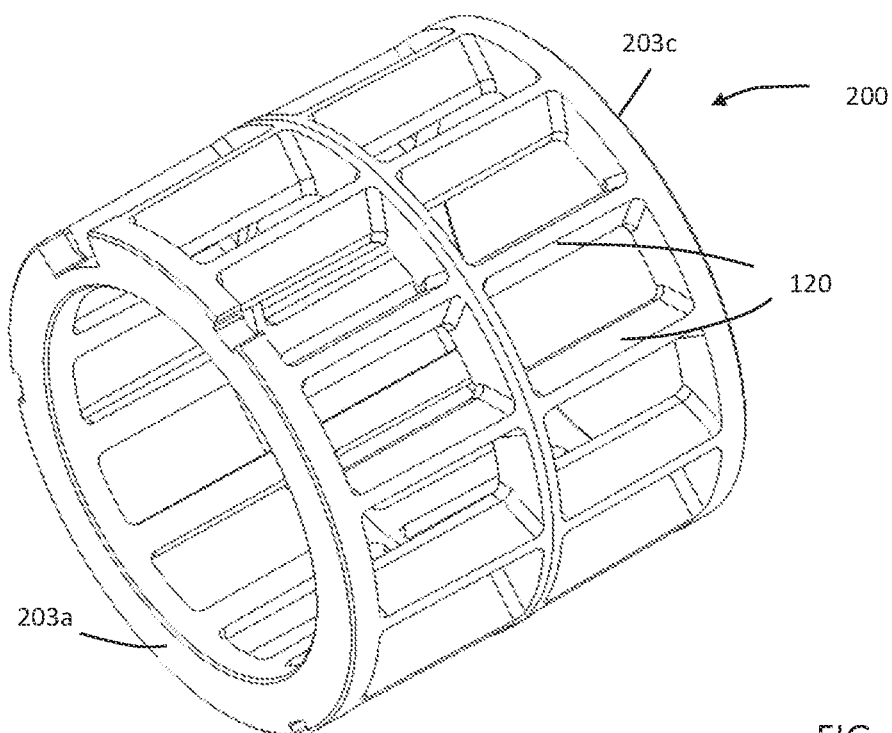
FIG. 11 is a side perspective view of a roller cage according to one exemplary embodiment.
Figure 12:
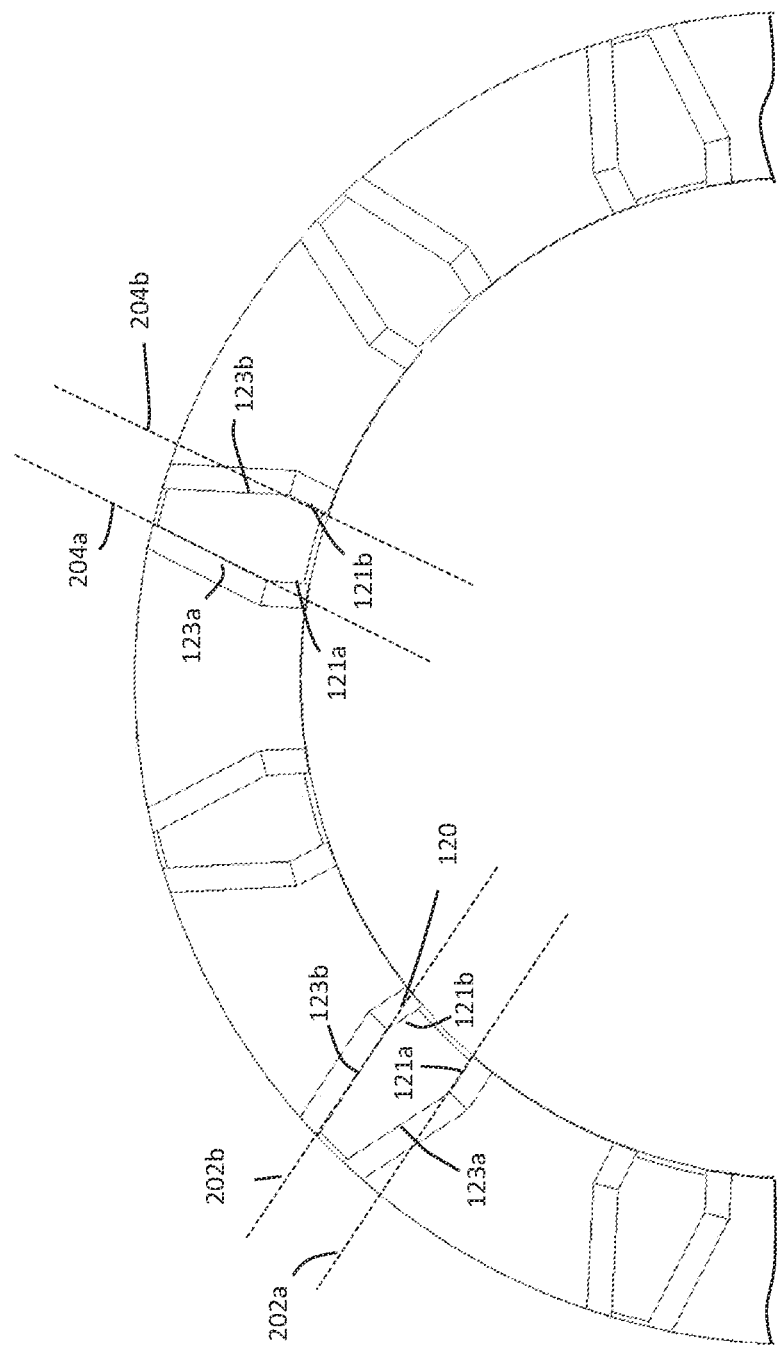
FIG. 12 is a partial end view of the roller cage of FIG. 11 illustrating parallel faces of support members according to one exemplary embodiment.

In another embodiment, as illustrated in FIG. 11, the roller cage 200 is formed from one piece of material. The parallel faces that form the sidewalls 123a and 123b and the retaining features 121a and 121b of the support members 120 allow for ease of fabrication in this example. As illustrated, the support members 120 extend between first and second end portions 203a and 203c. FIG. 12 further illustrates another example of parallel lines 202a, 202b and 204a and 204b used to form the parallel faces of the sidewalls 123a and 123b and retaining features of the support members 120.

An example of vehicle 300 implementing a differential 130 that includes a roller cage assembly with an overrunning clutch as described above is provided in the block diagram of FIG. 13. The vehicle 300 in this example includes a transmission that in this example includes a continuously variable transmission (CVT) 304 and a gear box 308. The CVT includes a drive sheave assembly 307, a driven sheave assembly 309 and an endless looped member 305 such as a belt. The drive sheave assembly 307 is in operational communication with a motor 302 to receive engine torque. The driven sheave assembly 309 is in operational communication with the drive sheave assembly 100 via the endless looped member 305 to selectively communicate torque between the drive sheave assembly 307 and the driven sheave assembly 309.

The driven sheave assembly 309 is in operation communication with a drivetrain that, in this example, includes the gear box 308, front and rear driveshafts 310 and 312 (or prop shafts), front and rear differentials 314 and 316, front half shafts 318a and 318b, rear half shafts 322a and 322b, front wheels 320a and 320b and rear wheels 324a and 324b. The front differential 314 includes the roller cage assembly with an overrunning clutch as described above to selectively couple torque between the gear box 308 and the front wheels 320a and 320b when needed.

EXAMPLE EMBODIMENTS

Example 1 includes a roller cage assembly for an overrunning clutch. The roller cage assembly includes a roller cage, a plurality of rollers and a plurality of roller spring assemblies. The roller cage includes a plurality of spaced support members axially extending between disk shaped first and second end portions. The plurality of rollers are positioned within the roller cage. The plurality of roller spring assemblies engage the roller cage. The plurality of spring roller assemblies are configured to provide a bias force on each roller away from the roller cage. Each roller cage assembly extends between the first and second end portions of the roller cage. Each roller spring assembly further includes at least one pair of attachment members configured to engage a support member of the roller cage.

Example 2 includes the roller cage assembly of Example 1, wherein each roller spring assembly further includes a central base plate extending between the first and second end portions of the roller cage. The central base plate further having opposed side edges. Each pair of attachment members include a first attachment member extending from a first side of the opposed side edges of the central base plate at a select angle and a second attachment member extending from a second side of the opposed side edges of the central base plate at a select angle. The first set of spaced biasing members extend from the first side of the opposed side edges of the central base plate at a select angle. The second set of spaced biasing members extend from the second side of the opposed side edges of the central base plate at a select angle. The first set and second set of biasing members are configured to provide the bias force on the rollers.

Example 3 includes the roller cage assembly of any of the Examples 1-2, wherein each of the first and second end portions of the roller cage includes an outer edge that defines an outer diameter of the first and second end portions and an inner edge that defines an inner edge of the first and second end portions. Each support member includes opposing sidewalls extending from the outer edge of first and second end portions to the inner edge of the first and second end portions at a select angle such that each support member is narrower at the outer edge of the first and second portions than the support member at the inner edge of the first and second end portions. Each sidewall includes a retaining feature proximate the inner edge of the first and second end portions. Each retaining feature running parallel to an opposite sidewall of the opposing sidewalls of the support member. The at least one pair of attachment members are configured to engage the retaining features of support members to retain the plurality of roller spring assemblies to the roller cage.

Example 4 includes the roller cage assembly of any of the Examples 1-3, wherein the roller cage further includes a first end portion, a second end portion and a mid-portion. The first end portion is in a disk shape configuration having an outer edge that defines an outer diameter of the first end portion and an inner edge that defines an inner edge of the first end portion. The first end portion further includes a plurality of spaced first support members extending axially from an inside surface of the first end portion. Each first support member includes opposing sidewalls extending from the outer edge of first end portion to the inner edge of the first end portion at a select angle such that each first support member is narrower at the outer edge of the first end portion than the first support member at the inner edge of the first end portion. Each sidewall includes a retaining feature proximate the inner edge of the first end portion. Each retaining feature runs parallel to an opposite sidewall of the opposing sidewalls. The second end portion is in a disk shape configuration that has an outer edge that defines an outer diameter of the second end portion and an inner edge that defines an inner edge of the second end portion. The second end portion further includes a plurality of spaced second support members extending axially from an inside surface of the second end portion. Each second support member includes opposing sidewalls that extend from the outer edge of the second end portion to the inner edge of the second end portion at a select angle such that each second support member is narrower at the outer edge of the second end portion than the second support member at the inner edge of the second end portion. Each sidewall includes a retaining feature proximate the inner edge of the second end portion. Each retaining feature runs parallel to an opposite sidewall of the opposing sidewalls. The mid-portion is positioned between the first end portion and the second end portion. The mid-portion is in a disk shape configuration that has an outer edge that defines an outer diameter of the mid-portion and an inner edge that defines an inner edge of the mid-portion. The mid-portion further includes a plurality of spaced mid support members extending axially from side surfaces of the mid-portion. Each mid support member includes opposing sidewalls extending from the outer edge of the mid-portion to the inner edge of the mid-portion at a select angle such that each mid support member is narrower at the outer edge of the mid-portion than the mid support member at the inner edge of the mid-portion. Each sidewall includes a retaining feature proximate the inner edge of the mid-portion. Each retaining feature runs parallel to an opposite sidewall of the opposing sidewalls.

Example 5 includes the roller cage assembly of Example 4, wherein each first support member, each second support member and each mid support member includes a pin bore used to couple the first end portion, the second end portion and the mid-portion together.

Example 6 includes a differential with a bi-directional overrunning clutch. The differential includes a housing, a ring gear, a clutch cam housing, first and second side hubs, and a roller cage assembly. The ring gear is positioned within the housing and is in operational communication with a pinion. The clutch cam housing includes a central passage. An inside surface of the clutch cam housing defines the central passage the includes spaced cam features. A rotation of the clutch cam housing is locked to a rotation of the ring gear within the housing. A first portion of the first side hub is received within the central passage of the clutch cam housing. A first portion of the second side hub received within the central passage of the clutch cam housing. The roller cage assembly is received within the central passage of the clutch cam housing. The roller cage assembly is further positioned between the inside surface of the central passage of the clutch cam housing and the first and second portions of the first and second side hubs. The roller cage assembly including a roller cage, a plurality of rollers positioned within the roller cage and a plurality of roller spring assemblies engaging the roller cage. The plurality of rollers including a first set of rollers engaging an outside surface of the first portion of a first side hub and a second set rollers engaging an outside surface of the first portion of the second side hub. The plurality of roller spring assemblies are configured to provide a bias force on each roller away from the roller cage. Each roller spring assembly extends between first and second end portions of the roller cage to provide the bias force to rollers from both of the first and second set of rollers. Each roller spring assembly further includes at least one pair of attachment members configured to engage the roller cage. A centering spring engages the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing.

Example 7 includes the differential of Example 6, wherein each roller spring assembly further includes a central base plate, a first set of spaced biasing members and second set of spaced biasing members. The central base plate extends between the first and second end portions of the roller cage and has opposed side edges. Each pair of attachment members includes a first attachment member that extends from a first side of the opposed side edges of the central base plate at a select angle and a second attachment member extending from a second side of the opposed side edges of the central base plate at a select angle. Each pair of attachment members are configured to engage a support member of a roller cage. The first set of spaced biasing members extend from the first side of the opposed side edges of the central base plate at a select angle. The second set of spaced biasing members extend from the second side of the opposed side edges of the central base plate at a select angle. The first set and second set of biasing members are configured to provide the bias force on rollers of the roller cage.

Example 8 includes the differential of Example 7, wherein the roller cage assembly further includes a plurality of spaced support members that axially extend between disk shaped first and second end portions. each of the first and second end portions including an outer edge that defines an outer diameter of the first and second end portions and an inner edge that defines an inner edge of the first and second end portions. Each support members includes opposing sidewalls that extend from the outer edge of first and second end portions to the inner edge of the first and second end portions at a select angle such that each support member is narrower at the outer edge of the first and second disk portion than the support member at the inner edge of the first and second disk portion. Each sidewall includes a retaining feature that is proximate the inner edge of the first and second disk portions. Each retaining feature runs parallel to an opposite sidewall of the opposing sidewalls of the support member.

Example 9 includes the differential of Example 8, wherein the at least one pair of attachment members are configured to engage the retaining features of support members to retain the plurality of roller spring assemblies to the roller cage.

Example 10 includes the differential of Example 7, wherein the roller cage further includes a first end portion, a second end portion and mid-portion. The first end portion is in a disk shape configuration having an outer edge that defines an outer diameter of the first end portion and an inner edge that defines an inner edge of the first end portion. The first end portion further includes a plurality of spaced first support members extending axially from an inside surface of the first end portion. Each first support member includes opposing sidewalls extending from the outer edge of first end portion to the inner edge of the first end portion at a select angle such that each first support member is narrower at the outer edge of the first end portion than the first support member at the inner edge of the first end portion. Each sidewall includes a retaining feature proximate the inner edge of the first end portion. Each retaining feature runs parallel to an opposite sidewall of the opposing sidewalls. The second end portion is in a disk shape configuration that has an outer edge that defines an outer diameter of the second end portion and an inner edge that defines an inner edge of the second end portion. The second end portion further includes a plurality of spaced second support members extending axially from an inside surface of the second end portion. Each second support member includes opposing sidewalls that extend from the outer edge of the second end portion to the inner edge of the second end portion at a select angle such that each second support member is narrower at the outer edge of the second end portion than the second support member at the inner edge of the second end portion. Each sidewall includes a retaining feature proximate the inner edge of the second end portion. Each retaining feature runs parallel to an opposite sidewall of the opposing sidewalls. The mid-portion is positioned between the first end portion and the second end portion. The mid-portion is in a disk shape configuration that has an outer edge that defines an outer diameter of the mid-portion and an inner edge that defines an inner edge of the mid-portion. The mid-portion further includes a plurality of spaced mid support members extending axially from side surfaces of the mid-portion. Each mid support member includes opposing sidewalls extending from the outer edge of the mid-portion to the inner edge of the mid-portion at a select angle such that each mid support member is narrower at the outer edge of the mid-portion than the mid support member at the inner edge of the mid-portion. Each sidewall includes a retaining feature proximate the inner edge of the mid-portion. Each retaining feature runs parallel to an opposite sidewall of the opposing sidewalls.

Example 11 includes the differential of Example 10, wherein each first support member, each second support member and each mid support member includes a pin bore used to couple the first end portion, the second end portion and the mid-portion together.

Example 12 includes the differential of any of the Examples 6-11, further including an inertial compensation assembly that is configured to selectively lock rotation of the roller cage assembly with the clutch cam housing to prevent unintended activation of the overrunning clutch.

Example 13 includes the differential of Example 12, wherein the inertial compensation assembly further includes an armature plate and an ORC. The armature plate is selectively positioned to lock rotation of roller cage with the clutch cam housing to prevent the roller cage assembly from retarding from the neutral position. The ORC positioned to selectively position the armature plate.

Example 14 includes the differential of Example 13, wherein the inertial compensation assembly further includes a flyweight plate and a back-drive coil. The flyweight plate is selectively positioned to lock rotation of roller cage with the clutch cam housing to prevent the roller cage assembly from advancing. The back-drive coil is positioned to selectively position the flyweight plate.

Example 15 includes the differential of nay of the Examples 6-14, further including a first end cap and a second end cap. The first end cap is mounted on an outside surface of a second portion of the first side hub. A side edge of the of first end cap engages a first end of the roller cage. The second end cap is mounted on an outside surface of a second portion of the second side hub. A side edge of the second end cap engages a second end of the roller cage.

Example 16 includes a vehicle. The vehicle includes a motor, a transmission, a pair of rear wheels, a pair of front wheels, and a front differential. The motor to provide engine torque. The transmission is in operational communication to receive the engine torque. The rear differential is in operational communication with the transmission. The pair of rear wheels in operational communication with the rear differential. The front differential selectively couples torque between the transmission and at least one front wheel of the pair of front wheels. The front differential includes a roller cage, a plurality of rollers and a plurality of roller spring assemblies. The roller cage includes a plurality of spaced support members axially extending between disk shaped first and second end portions. The plurality of rollers are positioned within the roller cage. The plurality of roller spring assemblies engages the roller cage. The plurality of spring roller assemblies are configured to provide a bias force on each roller away from the roller cage. Each roller spring assembly extends between the first and second end portions of the roller cage. Each roller spring assembly includes at least one pair of attachment members configured to engage a support member of the roller cage.

Example 17 includes the vehicle of Example 16 wherein each roller spring assembly further includes a central base plate, a first set of spaced biasing members and a second set of biasing members. The central base plate extends between the first and second end portions of the roller cage and has opposed side edges. Each pair of attachment members include a first attachment member extending from a first side of the opposed side edges of the central base plate at a select angle and a second attachment member extending from a second side of the opposed side edges of the central base plate at a select angle. The first set of spaced biasing members extend from the first side of the opposed side edges of the central base plate at a select angle. The second set of spaced biasing members extend from the second side of the opposed side edges of the central base plate at a select angle. The first set and second set of biasing members are configured to provide the bias force on the rollers.

Example 18 includes the vehicle of Example 17 wherein each of the first and second end portions of the roller cage includes an outer edge that defines an outer diameter of the first and second end portions and an inner edge that defines an inner edge of the first and second end portions. Each support member includes opposing sidewalls that extend from the outer edge of first and second end portions to the inner edge of the first and second end portions at a select angle such that each support member is narrower at the outer edge of the first and second portions than the support member at the inner edge of the first and second end portions. Each sidewall includes a retaining feature proximate the inner edge of the first and second end portions. Each retaining feature runs parallel to an opposite sidewall of the opposing sidewalls of the support member. The at least one pair of attachment members are configured to engage the retaining features of support members to retain the plurality of roller spring assemblies to the roller cage.

Example 19 includes the vehicle of Example 17, wherein the roller cage further includes a first end portion, a second end portion and a mid-portion. The first end portion is in a disk shape configuration having an outer edge that defines an outer diameter of the first end portion and an inner edge that defines an inner edge of the first end portion. The first end portion further includes a plurality of spaced first support members extending axially from an inside surface of the first end portion. Each first support member includes opposing sidewalls extending from the outer edge of first end portion to the inner edge of the first end portion at a select angle such that each first support member is narrower at the outer edge of the first end portion than the first support member at the inner edge of the first end portion. Each sidewall includes a retaining feature proximate the inner edge of the first end portion. Each retaining feature runs parallel to an opposite sidewall of the opposing sidewalls. The second end portion is in a disk shape configuration that has an outer edge that defines an outer diameter of the second end portion and an inner edge that defines an inner edge of the second end portion. The second end portion further includes a plurality of spaced second support members extending axially from an inside surface of the second end portion. Each second support member includes opposing sidewalls that extend from the outer edge of the second end portion to the inner edge of the second end portion at a select angle such that each second support member is narrower at the outer edge of the second end portion than the second support member at the inner edge of the second end portion. Each sidewall includes a retaining feature proximate the inner edge of the second end portion. Each retaining feature runs parallel to an opposite sidewall of the opposing sidewalls. The mid-portion is positioned between the first end portion and the second end portion. The mid-portion is in a disk shape configuration that has an outer edge that defines an outer diameter of the mid-portion and an inner edge that defines an inner edge of the mid-portion. The mid-portion further includes a plurality of spaced mid support members extending axially from side surfaces of the mid-portion. Each mid support member includes opposing sidewalls extending from the outer edge of the mid-portion to the inner edge of the mid-portion at a select angle such that each mid support member is narrower at the outer edge of the mid-portion than the mid support member at the inner edge of the mid-portion. Each sidewall includes a retaining feature proximate the inner edge of the mid-portion. Each retaining feature runs parallel to an opposite sidewall of the opposing sidewalls.

Example 20 includes the vehicle of claim 19 wherein each first support member, each second support member and each mid support member includes a pin bore used to couple the first end portion, the second end portion and the mid-portion together.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A roller cage assembly for an overrunning clutch, the roller cage assembly comprising:
   a roller cage including a plurality of spaced support members axially extending between disk shaped first and second end portions, each of the first and second end portions of the roller cage including an outer edge that defines an outer diameter of the first and second end portions and an inner edge that defines an inner edge diameter of the first and second end portions, each support member of the plurality of support members including opposing sidewalls extending from the outer edge of first and second end portions to the inner edge of the first and second end portions at a select angle such that each support member is narrower at the outer edge of the first and second portions than the support member at the inner edge of the first and second end portions, each sidewall including a retaining feature proximate the inner edge of the first and second end portions;
   a plurality of rollers positioned within the roller cage; and
   a plurality of roller spring assemblies engaging the roller cage, the plurality of roller spring assemblies configured to provide a bias force on each roller away from the roller cage, each roller spring assembly extending between the first and second end portions of the roller cage, each roller spring assembly further including at least one pair of attachment members configured to engage a support member of the plurality of support members of the roller cage.

2. The roller cage assembly of claim 1, wherein each roller spring assembly further comprises:
   a central base plate extending between the first and second end portions of the roller cage, the central base plate having opposed side edges;
   each pair of attachment members of the at least one pair of the attachment members include a first attachment member extending from a first side of the opposed side edges of the central base plate at a select angle and a second attachment member extending from a second side of the opposed side edges of the central base plate at a select angle;
   a first set of spaced biasing members extending from the first side of the opposed side edges of the central base plate at a select angle; and
   a second set of spaced biasing members extending from the second side of the opposed side edges of the central base plate at a select angle, the first set and second set of biasing members configured to provide the bias force on the rollers.

3. The roller cage assembly of claim 1, wherein each sidewall including a retaining feature proximate the inner edge of the first and second end portions, each retaining feature running parallel to an opposite sidewall of the opposing sidewalls of the support member, wherein the at least one pair of attachment members are configured to engage the retaining features of support members to retain the plurality of roller spring assemblies to the roller cage.

4. The roller cage assembly of claim 1, wherein the roller cage further comprises:
   a plurality of spaced first support members of the plurality of support members extending axially from an inside surface of the first end portion, each first support member including opposing sidewalls extending from the outer edge of first end portion to the inner edge of the first end portion at a select angle such that each first support member is narrower at the outer edge of the first end portion than the first support member at the inner edge of the first end portion, each sidewall including a retaining feature proximate the inner edge of the first end portion, each retaining feature running parallel to an opposite sidewall of the opposing sidewalls;
   a plurality of spaced second support members of the plurality of support members extending axially from an inside surface of the second end portion, each second support member including opposing sidewalls extending from the outer edge of the second end portion to the inner edge of the second end portion at a select angle such that each second support member is narrower at the outer edge of the second end portion than the second support member at the inner edge of the second end portion, each sidewall including a retaining feature proximate the inner edge of the second end portion, each retaining feature running parallel to an opposite sidewall of the opposing sidewalls; and
   a mid-portion positioned between the first end portion and the second end portion, the mid-portion being in a disk shape configuration having an outer edge that defines an outer diameter of the mid-portion and an inner edge that defines an inner edge of the mid-portion, the mid-portion further including a plurality of spaced mid support members of the plurality of support members extending axially from side surfaces of the mid-portion, each mid support member including opposing sidewalls extending from the outer edge of the mid-portion to the inner edge of the mid-portion at a select angle such that each mid support member is narrower at the outer edge of the mid-portion than the mid support member at the inner edge of the mid-portion, each sidewall including a retaining feature proximate the inner edge of the mid-portion, each retaining feature running parallel to an opposite sidewall of the opposing sidewalls.

5. The roller cage assembly of claim 4, wherein each first support member, each second support member and each mid support member includes a pin bore used to couple the first end portion, the second end portion and the mid-portion together.

6. A differential with a bi-directional overrunning clutch, the differential including:
   a housing;
   a ring gear positioned within the housing being in operational communication with a pinion;

a clutch cam housing including a central passage, an inside surface defining the central passage including spaced cam features, a rotation of the clutch cam housing locked to a rotation of the ring gear within the housing;

a first portion of a first side hub received within the central passage of the clutch cam housing;

a first portion of a second side hub received within the central passage of the clutch cam housing; and a roller cage assembly received within the central passage of the clutch cam housing, the roller cage assembly further positioned between the inside surface of the central passage of the clutch cam housing and the first and second portions of the first and second side hubs, the roller cage assembly including, a roller cage, a plurality of rollers positioned within the roller cage, the plurality of rollers including a first set of rollers engaging an outside surface of the first portion of the first side hub and a second set of rollers engaging an outside surface of the first portion of the second side hub, and a plurality of roller spring assemblies engaging the roller cage, the plurality of roller spring assemblies configured to provide a bias force on each roller away from the roller cage, each roller spring assembly extending between first and second end portions of the roller cage to provide the bias force to rollers from both of the first and second set of rollers, each roller spring assembly further including at least one pair of attachment members configured to engage the roller cage; and a centering spring engaging the clutch cam housing and the roller cage to position each roller of the plurality of rollers of the roller cage assembly in a central location within an associated cam feature of the spaced cam features in the inside surface of the clutch cam housing to place the roller cage assembly in a neutral position relative to the clutch cam housing; and an inertial compensation assembly configured to selectively lock rotation of the roller cage assembly with the clutch cam housing to prevent unintended activation of the overrunning clutch.

7. The differential of claim 6, wherein each roller spring assembly further comprises:

a central base plate extending between the first and second end portions of the roller cage, the central base plate having opposed side edges;

each pair of attachment members including a first attachment member extending from a first side of the opposed side edges of the central base plate at a select angle and a second attachment member extending from a second side of the opposed side edges of the central base plate at a select angle, each pair of attachment members configured to engage a support member of a plurality of spaced support members of the roller cage;

a first set of spaced biasing members extending from the first side of the opposed side edges of the central base plate at a select angle; and a second set of spaced biasing members extending from the second side of the opposed side edges of the central base plate at a select angle, the first set and second set of biasing members configured to provide the bias force on the rollers of the roller cage.

8. The differential of claim 7, further wherein the plurality of spaced support members axially extend between disk shaped first and second end portions, each of the first and second end portions including an outer edge that defines an outer diameter of the first and second end portions and an inner edge diameter that defines an inner edge of the first and second end portions, each support member of the plurality of support members including opposing sidewalls extending from the outer edge of first and second end portions to the inner edge of the first and second end portions at a select angle such that each support member is narrower at the outer edge of the first and second disk portion than the support member at the inner edge of the first and second disk portion, each sidewall including a retaining feature proximate the inner edge of the first and second disk portions, each retaining feature running parallel to an opposite sidewall of the opposing sidewalls of the support member.

9. The differential of claim 8, wherein the at least one pair of attachment members are configured to engage the retaining features of an associated support member of the plurality of support members to retain the plurality of roller spring assemblies to the roller cage.

10. The differential of claim 7, wherein the roller cage further comprises:

a first end portion in a disk shape configuration having an outer edge that defines an outer diameter of the first end portion and an inner edge that defines an inner edge of the first end portion, a plurality of spaced first support members of the plurality of support members extending axially from an inside surface of the first end portion, each first support member of the plurality of first support members including opposing sidewalls extending from the outer edge of first end portion to the inner edge of the first end portion at a select angle such that each first support member is narrower at the outer edge of the first end portion than the first support member at the inner edge of the first end portion, each sidewall including a retaining feature proximate the inner edge of the first end portion, each retaining feature running parallel to an opposite sidewall of the opposing sidewalls;

a second end portion in a disk shape configuration having an outer edge that defines an outer diameter of the second end portion and an inner edge that defines an inner edge of the second end portion, a plurality of spaced second support members of the plurality of support members extending axially from an inside surface of the second end portion, each second support member of the plurality of second support members including opposing sidewalls extending from the outer edge of second end portion to the inner edge of the second end portion at a select angle such that each second support member is narrower at the outer edge of the second end portion than the second support member at the inner edge of the second end portion, each sidewall including a retaining feature proximate the inner edge of the second end portion, each retaining feature running parallel to an opposite sidewall of the opposing sidewalls; and a mid-portion positioned between the first end portion and the second end portion, the mid-portion being in a disk shape configuration having an outer edge that defines an outer diameter of the mid-portion and an inner edge that defines an inner edge of the mid-portion, a plurality of spaced mid support members of the plurality of support members extending axially from side surfaces of the mid-portion, each mid support member of the plurality of mid support members including opposing sidewalls extending from the outer edge of the mid-portion to the inner edge of the mid-portion at a select angle such that each mid support member is narrower at the outer edge of the mid-portion than the mid support member at the inner edge of the mid-portion, each sidewall including a retaining feature proximate the inner edge of the mid-portion, each retaining feature running parallel to an opposite sidewall of the opposing sidewalls.

11. The differential of claim 10, wherein each first support member, each second support member and each mid support member includes a pin bore used to couple the first end portion, the second end portion and the mid-portion together.

12. The differential of claim 6, wherein the inertial compensation assembly further comprises:
an armature plate selectively positioned to lock rotation of roller cage with the clutch cam housing to prevent the roller cage assembly from retarding from the neutral position; and
an overrunning clutch (ORC) coil positioned to selectively position the armature plate.

13. The differential of claim 12, wherein the inertial compensation assembly further comprises:
a flyweight plate selectively positioned to lock rotation of roller cage with the clutch cam housing to prevent the roller cage assembly from advancing; and
a back-drive coil positioned to selectively position the flyweight plate.

14. The differential of claim 6, further comprising:
a first end cap mounted on an outside surface of a second portion of the first side hub, a side edge of the end cap engaging a first end of the roller cage; and
a second end cap mounted on an outside surface of a second portion of the second side hub, a side edge of the second end cap engaging a second end of the roller cage.

15. A vehicle comprising:
a motor to provide engine torque;
a transmission in operational communication to receive the engine torque;
a rear differential in operational communication with the transmission;
a pair of rear wheels in operational communication with the rear differential;
a pair of front wheels; and
a front differential to selectively couple torque between the transmission and at least one front wheel of the pair of front wheels, the front differential including,
a roller cage including a plurality of spaced support members axially extending between disk shaped first and second end portions, wherein each of the first and second end portions of the roller cage includes an outer edge that defines an outer diameter of the first and second end portions and an inner edge that defines an inner edge diameter of the first and second end portions, each support member including opposing sidewalls extending from the outer edge of first and second end portions to the inner edge of the first and second end portions at a select angle such that each support member is narrower at the outer edge of the first and second end portions than the support member at the inner edge of the first and second end portions,
a plurality of rollers positioned within the roller cage, and
a plurality of roller spring assemblies engaging the roller cage, the plurality of roller spring assemblies configured to provide a bias force on each roller away from the roller cage, each roller spring assembly extending between the first and second end portions of the roller cage, each roller spring assembly further including at least one pair of attachment members configured to engage a support member of the plurality of support members of the roller cage.

16. The vehicle of claim 15, wherein each roller spring assembly further comprises:
a central base plate extending between the first and second end portions of the roller cage, the central base plate having opposed side edges;
each pair of attachment members include a first attachment member extending from a first side of the opposed side edges of the central base plate at a select angle and a second attachment member extending from a second side of the opposed side edges of the central base plate at a select angle;
a first set of spaced bias members extending from the first side of the opposed side edges of the central base plate at a select angle; and
a second set of spaced bias members extending from the second side of the opposed side edges of the central base plate at a select angle, the first set and second set of bias members configured to provide a bias force on the rollers.

17. The vehicle of claim 16, wherein each sidewall including a retaining feature proximate the inner edge of the first and second end portions, each retaining feature running parallel to an opposite sidewall of the opposing sidewalls of the support member, wherein the at least one pair of attachment members are configured to engage the retaining features of support members to retain the plurality of roller spring assemblies to the roller cage.

18. The vehicle of claim 16 wherein the roller cage further comprises:
a plurality of spaced first support members of the plurality of support members extending axially from an inside surface of the first end portion, each first support member including opposing sidewalls extending from the outer edge of first end portion to the inner edge of the first end portion at a select angle such that each first support member is narrower at the outer edge of the first end portion than the first support member at the inner edge of the first end portion, each sidewall including a retaining feature proximate the inner edge of the first end portion, each retaining feature running parallel to an opposite sidewall of the opposing sidewalls;
a plurality of spaced second support members of the plurality of support members extending axially from an inside surface of the second end portion, each second support member including opposing sidewalls extending from the outer edge of the second end portion to the inner edge of the second end portion at a select angle such that each second support member is narrower at the outer edge of the second end portion than the second support member at the inner edge of the second end portion, each sidewall including a retaining feature proximate the inner edge of the second end portion, each retaining feature running parallel to an opposite sidewall of the opposing sidewalls; and a mid-portion positioned between the first end portion and the second end portion, the mid-portion being in a disk shape configuration having an outer edge that defines an outer diameter of the mid-portion and an inner edge that defines an inner edge of the mid-portion, the mid-portion further including a plurality of spaced mid support members of the plurality of support members extending axially from side surfaces of the mid-portion, each mid support member including opposing sidewalls extending from the outer edge of the mid-portion to the inner edge of the mid-portion at a select angle such that each mid support member is narrower at the outer edge of the mid-portion than the mid support member at the inner edge of the mid-portion, each sidewall including a retaining feature proximate the inner edge of the mid-portion, each retaining feature running parallel to an opposite sidewall of the opposing sidewalls.

19. The vehicle of claim 18, wherein each first support member, each second support member and each mid support member includes a pin bore used to couple the first end portion, the second end portion and the mid-portion together.

* * * * *